Patented June 12, 1934

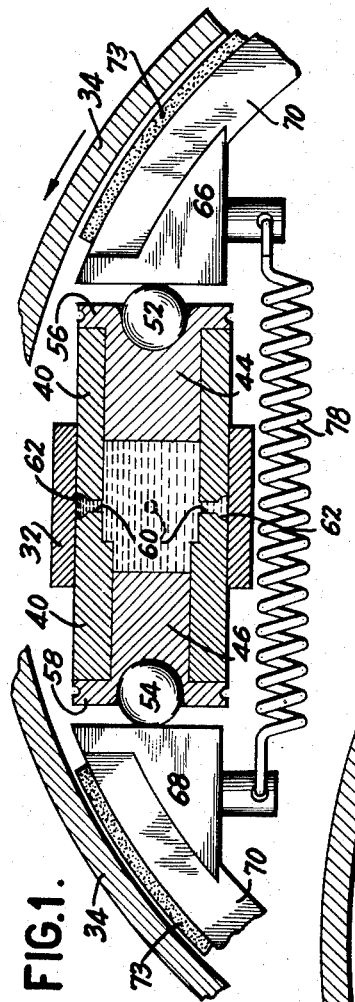
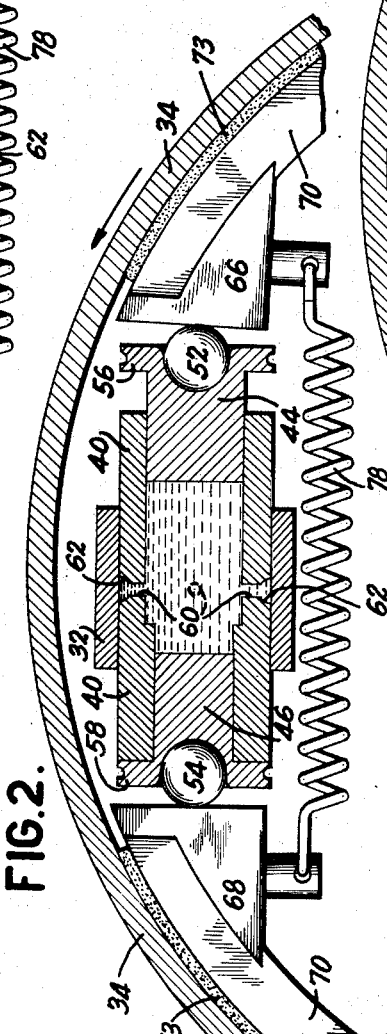
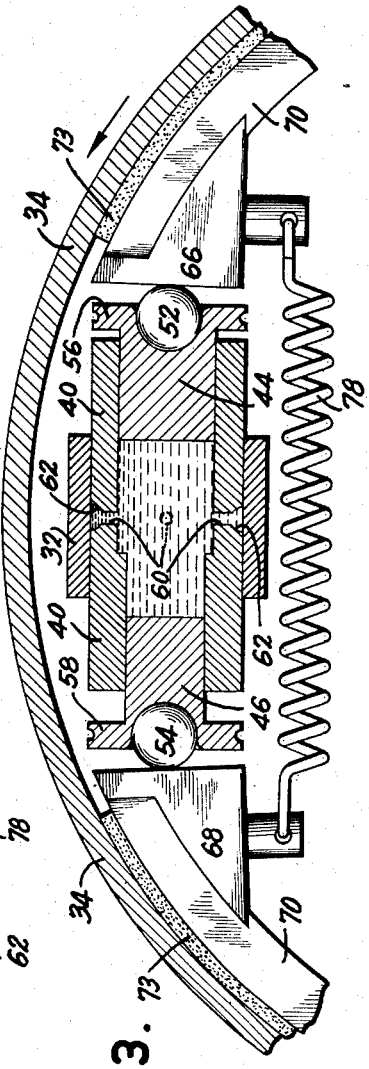

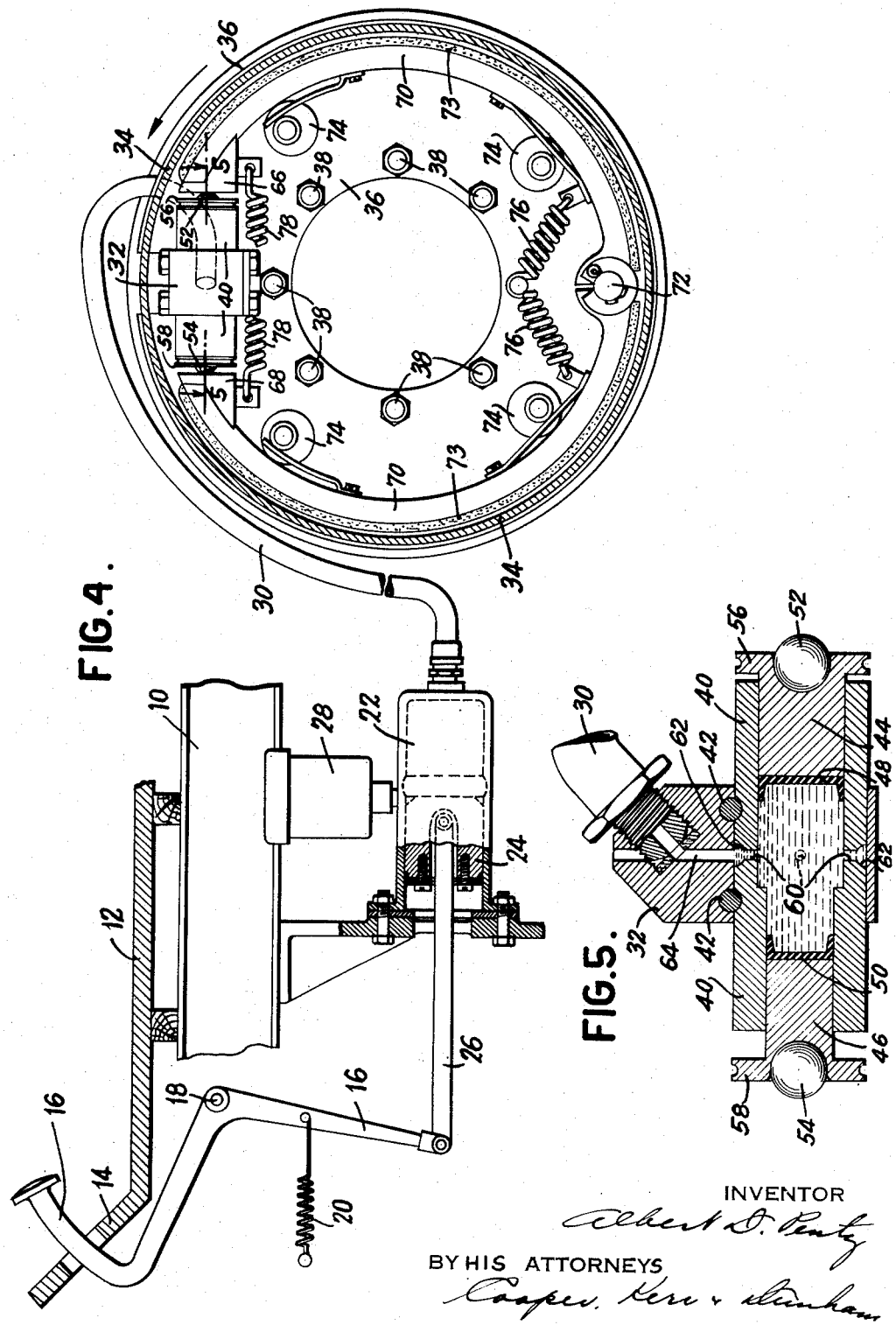

1,962,406

UNITED STATES PATENT OFFICE 1,962,406

HYDRAULIC BRAKE WITH DIFFERENTIAL PLUNGERS

Albert D. Pentz, New York, N. Y., assignor to Pentz Motor Brake Corporation, New Brighton, N. Y., a corporation of New York Application September 23, 1931, Serial No. 564,567

2 Claims. (Cl. 188—152)

This invention pertains to hydraulic brakes for vehicles and has for one of its objects the provision of a differential plunger actuating device which automatically acts as a booster to increase the pressure in the hydraulic system.

Further and other objects and advantages will be apparent from the specification and claims, and from the accompanying drawings which illustrate what is now considered the preferred embodiment of the invention.

Fig. 1 shows in diagrammatic form an actuating device in retracted position, with portions of the drum and floating brake band of friction means.

Fig. 2 is similar to Fig. 1 but with parts in their initial positions when the brake is first applied.

Fig. 3 is similar to Fig. 2 but with the parts in position after contact has been established between the friction means and the rotating drum.

Fig. 4 is a diagrammatic illustration of a complete brake and actuating mechanism.

Fig. 5 is a detail cross-section on line 5—5 of Fig. 4 showing one arrangement of cylinder and plungers.

Referring to Fig. 4, 10 represents a portion of an automobile frame; 12 the floor; 14 the footboard; 16 the brake lever pivoted at 18; 20 the retractile spring for lever 16; 22 the master cylinder; 24 the plunger in the master cylinder connected by link 26 to the lower end of lever 16; 28 the oil reservoir connected at its lower end to the master cylinder; 30 the hose connecting the master cylinder to the body 32 of an actuating unit within a brake drum 34 which is fastened to one of the wheels of the vehicle.

Body 32 of the actuating unit is rigidly mounted on apron 36 which is secured by bolts 38 to a nonrotatable part of an axle or steering knuckle. In Fig. 5 are shown details of one form of an actuating unit, comprising body 32; cylinder 40 open at both ends and secured to body 32 by pins 42; and plungers 44 and 46 reciprocable in the ends of the cylinder. The plungers are of different diameters for a purpose which will appear. They are equipped on their inner ends with cup washers 48—50, and on their outer ends with thrust balls 52—54, while stop flanges 56—58 serve to limit their inward travel. The fluid chamber between the plungers is connected to hose 30 by radial passages 60, circumferential groove 62, and channel 64.

Thrust balls 52—54 are in contact with thrust blocks 66—68 respectively, forming the ends of the floating friction device, which is shown as comprising a pair of similar shoes 70 hinged together at their lower ends by pin 72 so that the shoes form, in effect, a continuous brake band. The shoes are shod with friction material 73, and are held normally in retracted position against stops 74 and balls 52—54 by springs 76 and 78.

When the foot pedal is depressed, the actuating unit operates in a manner which may best be understood by reference to Figs. 1, 2 and 3.

Fig. 1 shows the normal, retracted positions of the parts, spring 78, acting through thrust blocks 66—68 serving to hold plungers 44—46 in their home positions with their flanges 56—58 against the ends of cylinder 40.

When the foot pedal is depressed, thus forcing more fluid through passages 60 into the cylinder, the plungers are forced apart against the tension of spring 78. Since the plungers are of different diameters the smaller one, 46, remains initially in home position, all motion being imparted to the larger plunger 44 until contact is made by bands 73 against the drum as in Fig. 2. If the drum is stationary or is rotating clockwise, the parts remain as shown in Fig. 2 throughout the entire brake applying operation, the pedal being simply forced downwardly by the operator until the required pressure is developed in the actuating cylinder. By referring to Fig. 2 of the drawings, it will be seen that when the drum is stationary and pressure is applied within the cylinder plunger 44 being larger than plunger 46 will move outwardly under application of pressure in the master cylinder 22 and plunger 46 will remain in its retracted position. There is no movement of plunger 46, since spring 78 tends to hold the same in its retracted position. If the drum is turned clockwise, plunger 44 will move outwardly, causing the brake band to engage the rotating drum and since the brake band is of the floating type, friction between the drum and the brake band will cause the end 68 to hold plunger 46 in its retracted position aided by the spring 78.

If, however, the drum is rotating counterclockwise as indicated by the arrow the parts function in a very different manner after contact is made between the friction means and the drum. When that contact is established the friction means rotates with the drum until the parts assume a position of equilibrium as in Fig. 3.

Plunger 44 while moving from its position in Fig. 2 to its position in Fig. 3 displaces liquid in the cylinder and forces plunger 46 outwardly to follow contact block 68 and maintains the corresponding end of the brake band in contact with the drum.

If plungers 44 and 46 were of equal area, the liquid displaced by plunger 44 would simply be moved towards the other end of the cylinder to force plunger 46 outwardly. There would be no movement of liquid through passages 60, and consequently no reaction against the foot pedal.

However, plunger 46 is of less diameter than plunger 44, therefore the cylinder containing plunger 46 is unable to accommodate all the liquid displaced by plunger 44, thus tending to force the surplus liquid through passages 60 and hose 30 into the master cylinder to tend to move plunger 24 and raise pedal 16. If the operator allows the pedal to rise in response to the increased reaction against it, plunger 44 will move inwardly as far as flange 56 will permit, and the operation of the brake will then be the same as if both plungers were of the same size, as in ordinary hydraulic brakes.

If, on the other hand, the operator maintains the pedal in its depressed position and does not let it rise in response to the increased back pressure, then the momentum of the vehicle, acting through the brake drum and brake band and pressing plunger 44 inwardly, serves to increase the intensity of pressure of the liquid in the system beyond the pressure initially set up therein by the operator. This increased pressure reacts, of course, against the friction means to press it more tightly against the drum and thereby increases the braking effect. To obtain this booster effect the operator must simply hold the pedal in the position to which he initially depressed it in order to bring the friction means into contact with the drum, thus requiring less work on his part than would be required if it were necessary for him to push the pedal further down in order to create the same pressure in the cylinder as is obtained by the automatic booster effect of the present invention.

Springs 20, 76 and 78 retract the parts to home positions as in Fig. 4 whenever the operator takes his foot from the pedal.

It is to be understood that the invention is not limited to the specific embodiment herein illustrated and described, but may be used in other ways without departure from its spirit as defined by the following claims.

I claim:

1. In a vehicle brake, in combination, a rotatable drum, a floating friction device having spaced-apart ends, and means between said ends for applying said friction device to said drum, said applying means including fluid and elements of different diameters for transmitting the pressure of said fluid to the ends of said friction device, whereby the pressure of said fluid is automatically increased in said applying means when said friction device is applied to said drum.

2. In a vehicle brake, in combination, a rotatable drum, a floating friction device having spaced-apart ends, and means between said ends for applying said friction device to said drum, said applying means including a cylinder containing fluid and supporting plungers of different diameters for transmitting the pressure of said fluid to the ends of said friction device, whereby the pressure of said fluid is automatically increased in said applying means when said friction device is applied to said drum.

ALBERT D. PENTZ.